United States Patent [19]

Cahill

[11] Patent Number: 4,609,290
[45] Date of Patent: Sep. 2, 1986

[54] PASSIVE HOMODYNE DEMODULATOR AND SENSOR SYSTEM

[75] Inventor: Richard F. Cahill, El Toro, Calif.

[73] Assignee: McDonnell Douglas Corporation, Long Beach, Calif.

[21] Appl. No.: 501,628

[22] Filed: Jun. 6, 1983

[51] Int. Cl.[4] .............................................. G01B 9/02
[52] U.S. Cl. ..................................... 356/345; 356/351
[58] Field of Search ............... 356/345, 351; 250/227; 367/149

[56] References Cited

U.S. PATENT DOCUMENTS 3,822,942 7/1974 Hock .................................... 356/351
4,375,680 3/1983 Cahill et al. .......................... 367/149
4,442,350 4/1984 Rashleigh ............................. 250/227

Primary Examiner—Davis L. Willis
Assistant Examiner—Matthew W. Koren
Attorney, Agent, or Firm—George W. Finch; Donald L. Royer; John P. Scholl

[57] ABSTRACT

A passive device which allows processing of signals impressed upon a light beam and arranged so that sensitivity is maximized and signal dropout, due to environmental effects such as temperature, do not occur. The passive homodyne demodulator includes a beam combiner, for combining the impressed light beam with a reference beam, beamsplitters, polarizing beamsplitters, and birefringent elements used as polarization shifters, so that ouputs are produced which are the sine and cosine of the phase change between the sensor and reference beams due to changes in the effective optical path length difference of the reference and sensor fibers due to the effect sensed. These signals are then electronically converted into an electrical output which linearly represents the phase of the signal originally impressed on the sensor fiber.

16 Claims, 14 Drawing Figures

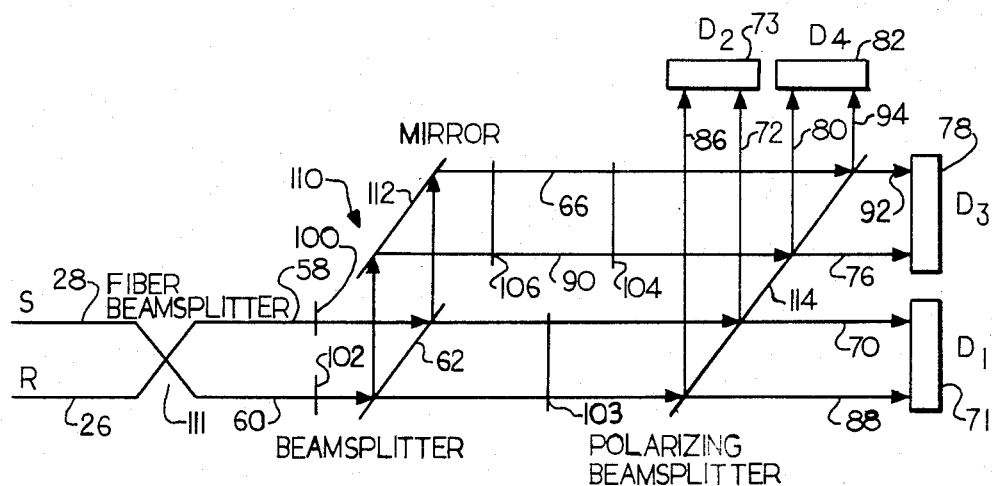
*FIG. 4*
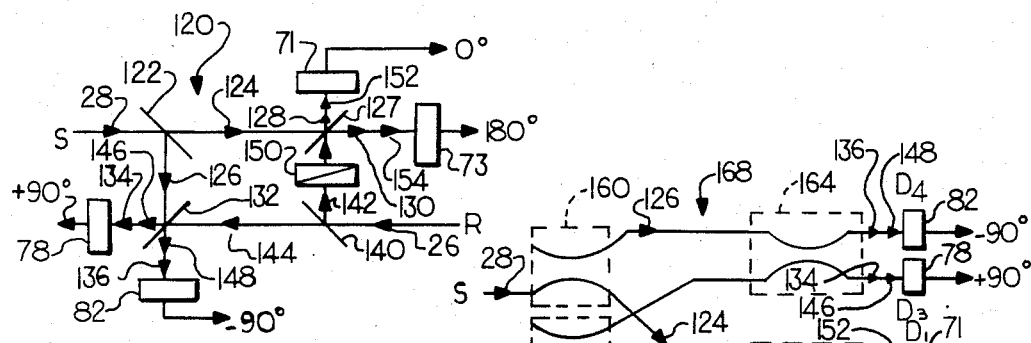
*FIG. 5*  *FIG. 6*
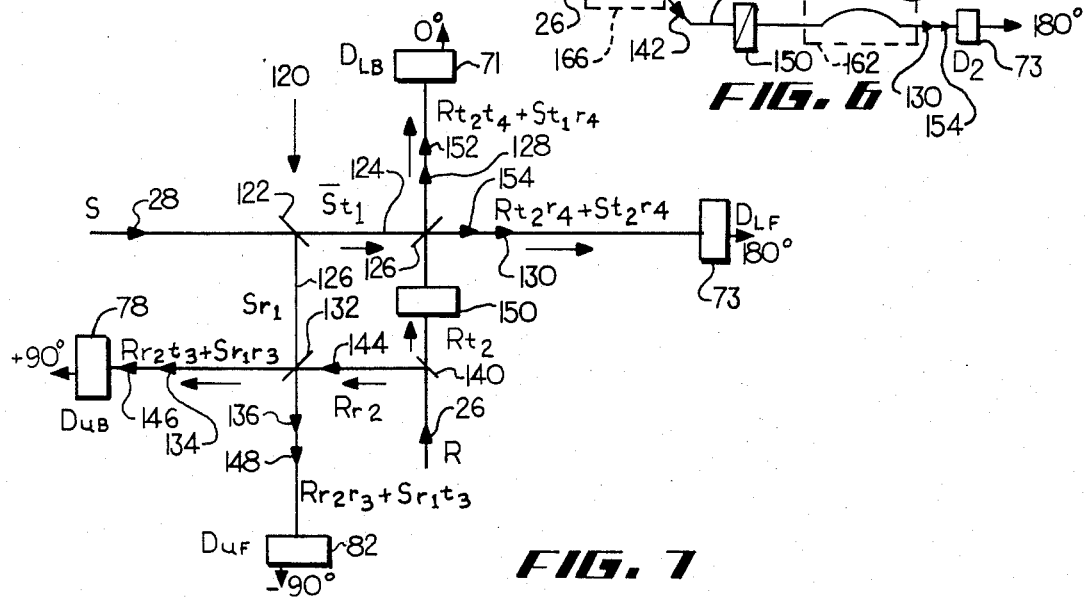
*FIG. 7*

PASSIVE HOMODYNE DEMODULATOR AND SENSOR SYSTEM

CROSS-REFERENCE TO RELATED PATENT APPLICATIONS

This case is related to U.S. Pat. No. 4,375,680 entitled, "Acoustic Sensor" and U.S. Pat. Ser. No. 309,254 filed Oct. 7, 1981 entitled, "Improved Optical Gyro" both of which are by Richard F. Cahill and Eric Udd and are assigned to Applicants' assignee. The teachings of those applications are hereby incorporated by reference as though fully set forth herein below.

BACKGROUND OF THE INVENTION

Extremely sensitive low cost sensors such as acoustic sensors are required for a wide range of applications, many of which involve operation under hostile environments. Typical examples include geophones or hydrophones used to record the response of the earth to acoustic impulses applied thereto in search for minerals and petroleum both on land and under water. It has been recognized that fiber optics may allow the construction of rugged high performance acoustic sensors. In particular, approaches have been developed successfully which are based on the comparison of light passed through a reference optical fiber shielded from acoustic noise with light passed through a second signal fiber which is subjected to the energy wished to be detected. One such approach is reported in U.S. Pat. No. 4,297,887 entitled "High-Sensitivity, Low-Noise, Remote Optical Fiber" by J. A. Bucaro. Unfortunately, such devices are not always able to provide features and desirable attributes such as automatic noise suppression, low cost, small size, simple design, and ease of incorporation in acoustic sensor arrays. These and other sensitive devices, such as taught by Cahill and Udd in U.S. Pat. No. 4,375,680, require electronic feedback mechanisms for readout and signal stabilization.

BRIEF DESCRIPTION OF THE PRESENT INVENTION

The present passive homodyne demodulator optical acoustic sensor includes a light source, such as a laser, laser diode, light emitting diode, or other source, which ultimately produces a light beam. The beam is split into two mutually coherent light beams with one light beam propagating through a reference fiber which in the case of as acoustic sensor is acoustically isolated or differentially insonofied while the other light beam propagates through a sensor fiber which is acoustically insonofied. Both the reference and sensor fibers are then subjected to the environment so that any relative changes in length and index of refraction therebetween are the result of acoustic energy impinging on the sensor fiber. Possible undesired differential environmental effects, such as thermal or mechanical strain between the sensor and reference fibers, can also produce relative changes in length and index of refraction but such effects are usually of such low frequency that they can be filtered out.

A suitable way of mounting the fibers is to wind the sensor fiber about an acoustically sensitive mandrel that enhances the signal impressed on the sensor fiber while the reference fiber is placed inside a hard container through which acoustic signals can not penetrate. The two fibers are then connected to demodulator optics which convert the light outputs of the sensor and reference fibers into optical intensity signals which are the offset sine and cosine of the differential phase change due to the optical path length difference between the reference and sensor fibers and hence represent the desired acoustic signal. These light signals are then either directly detected or transmitted by fiber optics to detectors at a position relatively environmentally secure at which position they are converted by an electronic demodulator into an electrical output signal which is a linear function of the phase change induced by the acoustic signal. This electrical signal can be operated on by various means to achieve desired information.

The passive homodyne demodulator, optical acoustic sensor approach is a technique that allows high performance acoustic sensing to be achieved without electronic feedback, greatly reducing size, and simplifying construction, operation and maintenance requirements. Use of the present demodulator allows the formation of sensor arrays that are entirely optical since the acoustic signals, which are to be detected, are impressed upon a light beam that is one of the inputs to the demodulator and the output signal is also carried on light beams. The sensor is arranged optically so that sensitivity is maximized and signal dropout, due to environmental effects, such as temperature, do not occur. The optical demodulator is easy to assemble, rugged, and very small. It also has the advantage of significant cost savings due to reduced electronics cost as well as reduced sensitivity to electromagnetic effects.

The end result is a highly sensitive, acoustic sensor system which can be incorporated into large arrays and which can use light to transmit acoustic information out of a region in a stable form for further processing in a more friendly environment.

It is therefore an object of the present invention to provide an energy sensor of high sensitivity which requires no electronic feedback mechanisms for readout and signal stablization.

Another object is to provide an acoustic sensor having a performance level compatible with many sophisticated applications such as seismic exploration and underwater towed arrays.

Another object is to provide an optical sensor in which a major amount of signal processing occurs before conversion to electronic signals.

Another object is to provide an acoustic sensor which is relatively insensitive to environmental effects such as temperature or electromagnetic fields.

Another object is to provide a high quality acoustic sensor which is relatively economic to construct and which can be incorporated into large arrays.

These and other objects and advantages of the present invention will become apparent to those skilled in the art after considering the following detailed specification which covers preferred embodiments thereof in conjunction with the accompanying drawings wherein:

BRIEF DESCRIPTION OF THE DRAWINGS

FIG. 4 is a schematic diagram of a compact folded configuration of an optical demodulator similar to that shown in FIGS. 2 and 3;

FIG. 5 is a diagram of another configuration of an all optical passive homodyne demodulator;

FIG. 6 is a diagram of an all-optical fiber, passive homodyne which employs fiber couplers as its light mixing elements which is an analog of the device of FIG. 5;

FIG. 7 is a more detailed, diagrammatic view of the device of FIG. 5, including the light beam information to support analysis of the device;

DETAILED DESCRIPTION OF THE SHOWN EMBODIMENTS

Figure 1:
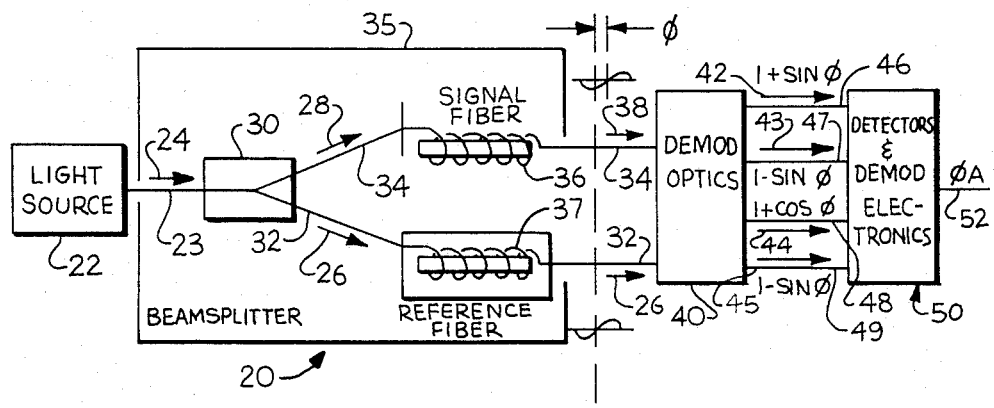
FIG. 1 is a block diagram of a passive homodyne optical acoustic sensor system constructed according to the present invention.

Referring to the drawings, more particularly by reference numbers, number 20 in FIG. 1 refers to a passive homodyne system which includes a source 22 of a light beam 24. The source 22 may be a laser diode or other device which produces light whose coherence length is longer than any residual difference between the two fiber interferometer arms in which it is transmitted. The beam 24 is split into a reference beam 26 and a sensor beam 28 by a beamsplitter 30. The reference beam 26 is propagated through a reference fiber 32 which is acoustically isolated. The sensor beam 28 propagates through a sensor fiber 34 so that an optical interferometer 35 is formed. Both fibers 32 and 34 are wound on mandrels 36 and 37, with mandrel 36 being used to enhance the signal to be sensed and then acoustically impress it upon the sensor fiber 34. By having both fibers 32 and 34 exposed to similar environments except for acoustic signals, other environmental effects are impressed on both beams 26 and 28 nearly identically and are mostly cancelled out when the phase differences of the beams 26 and 28 are detected. The beam 28 thereafter includes phase variations indicative of the acoustic signals impressed on the sensor fiber 34. This phase-shifted beam 38 along with the reference beam 26 are passed to demodulator optics 40 by the fibers 34 and 32. The optics 40 are used to convert the beams 38 and 26 into optical signals 42, 43, 44, and 45 which are K+sine $\phi$, K−sine $\phi$, K+cosine $\phi$, and K−cosine $\phi$ where $\phi$ is the phase change due to the instantaneous optical path length difference between the reference fiber 32 and the sensor fiber 34 and K is a constant having a magnitude of at least 1. The optical signals 42, 43, 44, and 45 are passed by means of optical fibers 46, 47, 48, and 49 to demodulator electronics 50 which convert optical signals 42, 43, 44, and 45 into an output $\phi_A$ on the electrical output line 52 of the demodulator electronics 50. The output $\phi_A$ is the phase difference caused by the acoustic signal impressed on the sensor fiber 34.

Figure 2:
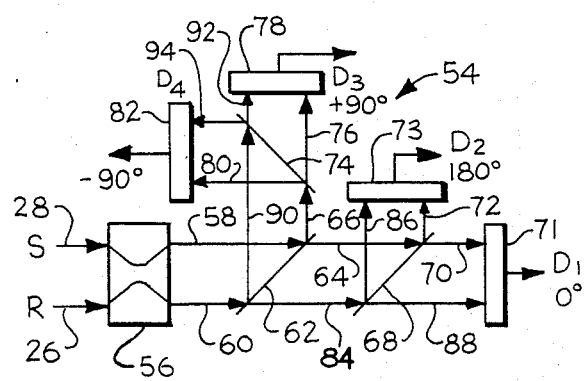
FIG. 2 is a diagram of the demodulator optics for the system of FIG. 1.

An embodiment 54 of the demodulator optics 40 is shown in FIG. 2 that combines discrete optical components and fiber optics. The reference beam 26 and the sensor beam 28 are fed, with opposite vertical and horizontal linear polarizations, to and combined by a fiber coupler 56 into fiber coupler output beams 58 and 60. The output beam 58 is split by a beamsplitter 62 into two beams 64 and 66, beam 64 passing through the beamsplitter 62 and falling upon a polarizing beamsplitter 68. The p-polarization state 70 of the beam 64 passes through the polarizing beamsplitter 68 and falls onto detector 71 while the s-polarization state 72 reflects off of the beamsplitter 68 and falls onto detector 73. The portion 66 of the beam 58 that reflects off of the beamsplitter 62 falls onto a second polarizing beamsplitter 74. The p-polarization state 76 of beam 66 passes through the polarizing beamsplitter 74 and falls onto the detector 78. The s-polarization state 80 of the beam 66 reflects off the polarizing beamsplitter 74 and falls onto detector 82. The output beam 60 from the fiber coupler 56 is partitioned in a similar manner by the beamsplitters 62, 68, and 74 so that beam 84, which passes through the beamsplitter 62, has its s-polarization state 86 reflected off of the beamsplitter 68 onto the detector 73, while its p-polarization state 88 passes through the polarizing beamsplitter 68 to enter the detector 71. The portion 90 of the beam 60 which reflects off of the beamsplitter 62 has its p-polarization state 92 pass through the polarizing beamsplitter 74 onto the detector 78 while its s-polarization state 94 reflects off of the polarizing beamsplitter 74 and onto the detector 82. If the optics are balanced, essentially the same signal is produced at the detectors 71, 73, 78, and 82. However, it is shifted in phase 0°, 180°, +90° and −90°, respectively.

Figure 3:
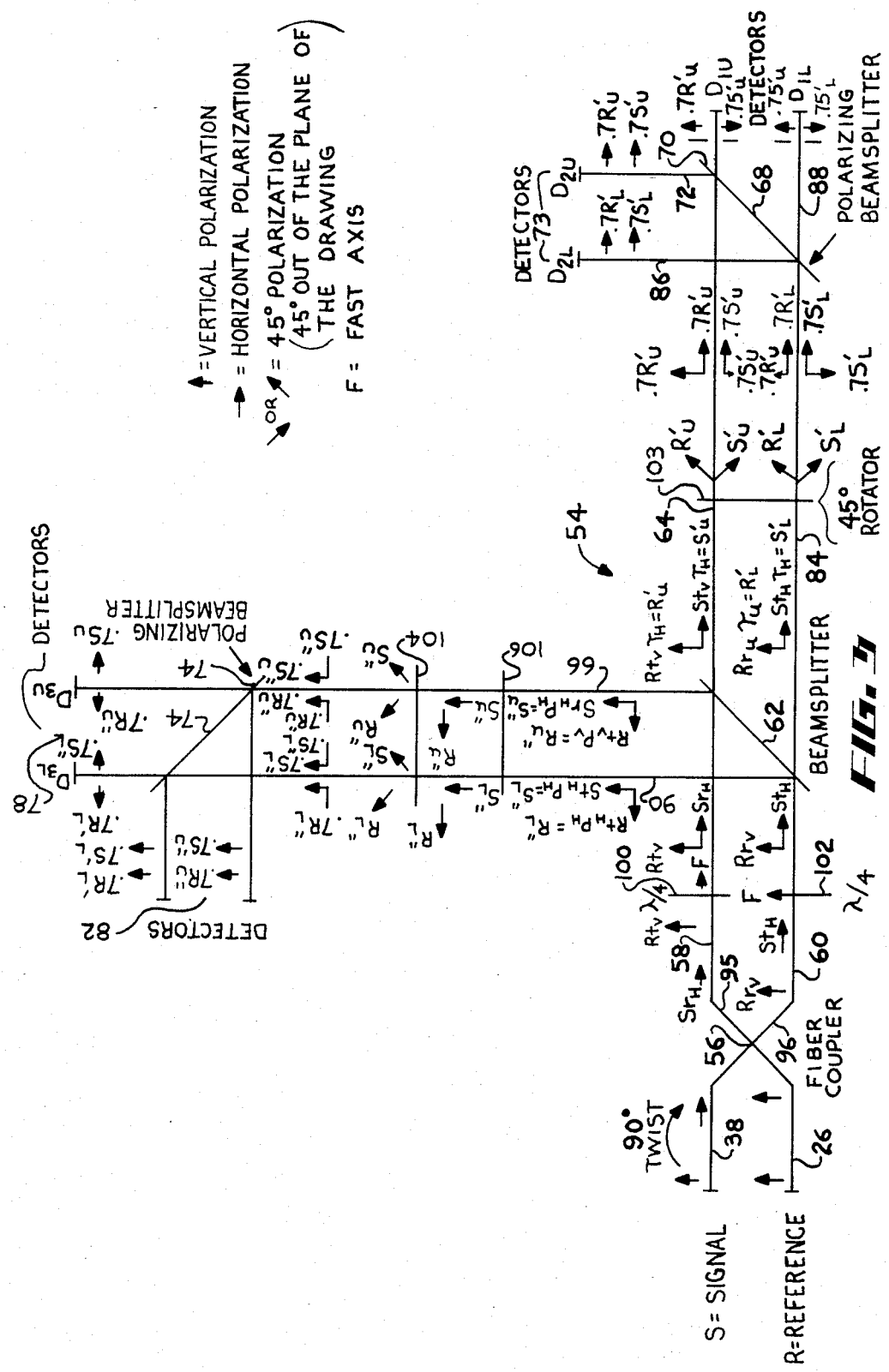
FIG. 3 is a diagram similar to FIG. 2 annotated to support analysis of the present sensor system demodulator optics.

The action of the demodulator 54 is shown in greater detail in FIG. 3. The sensor and reference beams 38 and 26, as they enter the fiber coupler 56 from the interferometer output are polarized orthogonally to each other. This can be done by twisting the end of a polarization preserving fiber, not shown, by 90° at the signal input or by other type devices. The combined signal and reference beams 58 and 60 in each arm 95 and 96 of the output of the fiber coupler 56 are orthogonal to each other and have amplitudes equal to their original amplitudes multiplied by the appropriate reflection or transmission coefficient of the fiber coupler 56. In FIG. 3, the subscripts $V$ and $H$ refer to the vertical and horizontal polarizations respectively of the beams. Upon transmission through the fiber coupler 56, a 180° phase shift occurs between the signal and reference beam portions of the beams 58 and 60. Quarter wave plates 100 and 102 are used to readjust this so the horizontal and vertical components of the beams 58 and 60 are in phase again, that is the components have the same phase relationship as they had when they entered the fiber coupler 56.

The two beams 58 and 60 then encounter the beamsplitter 62 which preferrably splits each of the beams into two beams of equal amplitude. Half 64 and 84 of each beam 58 and 60 is transmitted with the indicated amplitudes $Rt_V\tau_V$ and $Sr_H\tau_H$, and $Rf_V\tau_V$ and $St_H\tau_H$. Here $\tau_V$ and $\tau_H$ are the transmission coefficients of the beamsplitter 62. $\rho_V$ and $\rho_H$ are its reflection coefficients and hence the other halves 90 and 66 of each beam have amplitudes $Rt_H\rho_H$ and $St_H\rho_H$, and $Rt_V\tau_V$ and $Sr_H\rho_H$. For the transmitted beam components, the notation is shortened to $R'_U$, $S'_U$, $R'_L$, and $S'_L$ for the amplitudes of the four beams (two beams, each having two polarizations) in the upper and lower beams 64 and 84 which pass through the beamsplitter 62. A shorthand notation of $R_L''$ and $S_L''$ is used for beam 90 and $R_U''$ and $S_U''$ is used for beam 66.

The beamsplitter 62 actually should be rotated by 45°, however, this is difficult if not impossible to show with clarity in FIG. 3. Therefore, the equivalent artifact of introducing 45° rotators 103 and 104 in the beams 64 and 84, and 66 and 90 is shown. The actual demodulator 54 would not include the rotators 102 and 104 unless the demodulator 54 was constructed on a planar substrate where it is desired to keep all of the beams in a single plane. In branches 64 and 84, the effect of this rotation is to provide common polarization for the portions of the R' and S' vectors in both the upper and lower branches 64 and 84 to produce the desired interference effects.

The light transmitted in the beams 64 and 84 is then passed to the polarizing beamsplitter 68 which in the orientation of FIG. 3 in vertically polarized. The beamsplitter 68 passes 0.707 of the vertically polarized portions of beams 64 and 84 to the detector 71 and reflects 0.707 of the horizontally polarized portions of beams 64 and 84 onto the detector 73. At one spot $D_{1U}$ on detector 71, the 180° out-of-phase portions of 0.7R' and 0.7S' result in an output current proportional to the square of the difference between these two beam amplitudes. At the other spot $D_{1L}$ on the detector 71, 180° out-of-phase portions of $0.7R'_L$ and $0.7S'_L$ result in an additional output current proportional to the square of the difference between these two beam amplitudes. The photo diode output of the detector 71 is equal to the sum of these two currents. If the transmittance and reflectance at the initial fiber coupler 56 are identical for the two orthogonal polarizations, the currents due to the upper and lower beams 64 and 84 of the demodulator 54 will be equal. In the event that the transmittance and reflectance are unequal, use of the two beams on one diode 71 produces a balancing effect that eliminates errors due to the inequality.

At detector 73, each of the two spots $D_{2L}$ and $D_{2U}$ utilized, receives the horizontal portions of the R' and S' signals. The output current from detector 73 is proportional to the sum of the currents at each of the two spots. The purpose of using two separate spots on the detector 73 is to compensate for any inequality in the reflectance and transmittance of the fiber coupler 56 for the two polarizations as in the previous description of detector 71. Differencing the outputs from detector 71 and detector 73 yields a signal proportional to the cosine of the acoustic phase shift of the sensor interferometer 35.

For the beams 66 and 90 reflected by the beamsplitter 62, the light is expressed as the product of the original amplitude of R or S multiplied by the appropriate reflection coefficient, $\rho$. The resulting amplitudes in beam 66 and 90 are labeled $R_L''$ and $S_L''$ if they originate from the lower beam 60 or $R_U''$ and $S_U''$ if they originate from the upper beam 58.

A quarter-wave beamsplitter 106 is inserted in the beams 66 and 90. Its effect is to introduce a quarter-wave phase difference between the vertically polarized R'' components and the horizontally polarized S'' components. The purpose of this phase shift is to allow the output of the detectors 78 and 82 to be processed to yield a signal proportional to the sine of the acoustic phase shift rather than the cosine as was done with the beams 64 and 84. Following the quarter-wave phase shifter 106 the 45° rotator 104 is introduced to avoid sketching the polarizing beamsplitter in a position rotated 45° out of the plane of the paper as explained before. The vectors shown in FIG. 3 after the 45° rotator 104 represent the R'' and S'' vector amplitudes 90° apart in phase and rotated plus and minus 45° respectively, from horizontal polarization. The horizontal and vertical components of R'' and S'' portions are separated by the polarizing beamsplitter 74 as beamsplitter 68 did for beams 64 and 84 so that two beam spots are produced on each of the detectors 78 and 82 to produce an additive effect to correct for amplitude differences caused by nonsymmetries of the system as was true for detectors 71 and 73. When the signals from the detectors 78 and 82 are differenced, the result is a signal proportional to the sine of the acoustic phase angle difference between the sensor and reference beams 28 and 26.

A modified version 110 of the demodulator 54 is shown in simple diagrammatic form in FIG. 4 which shows that the physical layout of a demodulator 110 can be more compact, the components and beams which are identical in demodulators 54 and 110 have been given the same numbers. The difference between the demodulators 110 and 54 is that beams 90 and 66 are reflected off a mirror 112 so that a common polarizing beamsplitter 114 can be used in substitution for the polarizing beamsplitter 68 and 74. Otherwise the demodulator 110 operates identically to the demodulator 54.

An analysis of the signals falling on the detectors 71, 78, 73 and 82 is included hereinbelow.

$$D_{1L} = .7Rr_V\tau_V\cos\omega t - .7St_H\tau_H\cos(\omega t + \phi)$$

$$I_{1L} = \langle(D_{1L})^2\rangle$$

$$I_{1L} = \frac{(Rr_V\tau_V)^2}{4} + \frac{(St_H\tau_H)^2}{4} - \frac{RSr_Vt_H\tau_V\tau_H\langle\cos\omega t \cos(\omega t + \phi)\rangle}{2}$$

$$\langle\cos\omega t \cos(\omega t + \phi)\rangle = \langle\tfrac{1}{2}[\cos(2\omega t + \phi) + \cos(\phi)]\rangle = \tfrac{1}{2}\cos\phi$$

$$I_{1L} = \frac{(Rr_V\tau_V)^2}{4} + \frac{(St_H\tau_H)^2}{4} - \frac{RSr_Vt_H\tau_V\tau_H\cos\phi}{2}$$

Similarly, $$D_{1U} = .7Rt_V\tau_V\cos\omega t - .7Sr_H\tau_H\cos(\omega t + \phi)$$

$$I_{1U} = \frac{(Rt_V\tau_V)^2}{4} + \frac{(Sr_H\tau_H)^2}{4} - \frac{RSr_Ht_V\tau_H\tau_V\cos\phi}{2}$$

$$I_1 = I_{1L} + I_{1U}$$

$$I_1 = \frac{(R\tau_V)^2}{4}(r_V^2 + \tau_V^2) + \frac{(S\tau_H)^2}{4}(r_H^2 + t_H^2) - \frac{RS\tau_H\tau_V(r_Vt_H + r_Ht_V)\cos\phi}{2}$$

$$D_{2L} = .7Rr_V\tau_V\cos\omega t + .7St_H\tau_H\cos(\omega t + \phi)$$

$$I_{2L} = \frac{(Rr_V\tau_V)^2}{4} + \frac{(St_H\tau_H)^2}{4} + \frac{RSr_Vt_H\tau_V\tau_H\cos\phi}{2}$$

$$D_{2U} = .7Rt_V\tau_V\cos\omega t + .7Sr_H\tau_H\cos(\omega t + \phi)$$

-continued $$I_{2U} = \frac{(Rt_V\tau_V)^2}{4} + \frac{(Sr_H\tau_H)^2}{4} + \frac{RSr_Ht_V\tau_H\tau_V\cos\phi}{2}$$

$$I_2 = I_{2L} + I_{2U}$$

$$I_2 = \frac{(R\tau_V)^2}{4}(r_V^2 + t_V^2) + \frac{(S\tau_H)^2}{4}(r_H^2 + t_H^2) + \frac{RS\tau_V\tau_H(r_Vt_H + r_Ht_V)\cos\phi}{2}$$

$$I_2 - I_1 = RS\tau_V\tau_H(r_Vt_H + r_Ht_V)\cos\phi$$

Similarly for Detectors $D_3$ and $D_4$:

$$D_{3L} = .7Rr_V\rho_V\cos(\omega t + \pi/2) - .7St_H \rho_H \cos(\omega t + \phi)$$

$$= .7Rr_V\rho_V\sin\omega t - .7St_H\rho_H\cos(\omega t + \phi)$$

$$I_{3L} = \frac{(Rr_V\rho_V)^2}{4} + \frac{(St_H\rho_H)^2}{4} - <RSr_Vt_H\rho_V\rho_H\sin\omega t \cos(\omega t + \phi)>$$

$$<\sin\omega t \cos(\omega t + \phi)> = <\tfrac{1}{2}[\sin(2\omega t + \phi) - \sin(\phi)]>$$
$$= -\tfrac{1}{2}\sin\phi$$

$$I_{3L} = \frac{(Rr_V\rho_V)^2}{4} + \frac{(St_H\rho_H)^2}{4} - \frac{RSr_Vt_H\rho_V\rho_H\sin\phi}{2}$$

$$D_{3L} = .7Rt_V\rho_V\cos(\omega t + \pi/2) - .7Sr_H\rho_H\cos(\omega t + \phi)$$

And, as in $I_{3L}$, $$I_{3U} = \frac{(Rt_V\rho_V)^2}{4} + \frac{(Sr_H\rho_H)^2}{4} + \frac{RSr_Ht_V\rho_V\rho_H\sin\phi}{2}$$

$$I_3 = I_{3L} + I_{3U}$$

$$I_3 = \frac{(R\rho_V)^2}{4}(r_V^2 + t_V^2) + \frac{(S\rho_H)^2}{4}(r_H^2 + t_H^2) + \frac{RS\rho_V\rho_H(r_Vt_H + r_Ht_V)\sin\phi}{2}$$

Again, as in $D_{3L}$, $$D_{4L} = .7Rr_V\rho_V\cos(\omega t + \pi/2) + .7St_H\rho_H\cos(\omega t + \phi)$$

$$I_{4L} = \frac{(Rr_V\rho_V)^2}{4} + \frac{(St_H\rho_H)^2}{4} - \frac{RSr_Vt_H\rho_V\rho_H\sin\phi}{2}$$

$$D_{4U} = .7Rt_V\rho_V\cos(\omega t + \pi/2) + .7Sr_H\rho_H\cos(\omega t + \phi)$$

$$I_{4U} = \frac{(Rt_V\rho_V)^2}{4} + \frac{(Sr_H\rho_H)^2}{4} - \frac{RSr_Ht_V\rho_V\rho_H\sin\phi}{2}$$

$$I_4 = I_{4L} + I_{4U}$$

$$I_4 = \frac{(R\rho_V)^2}{4}(r_V^2 + t_V^2) + \frac{(S\rho_H)^2}{4}(r_H^2 + t_H^2) - \frac{RS\rho_V\rho_H(r_Vt_H + r_Ht_V)\sin\phi}{2}$$

$$I_3 - I_4 = RS\rho_V\rho_H(r_Vt_H + r_Ht_V)\sin\phi$$

Figure 8:
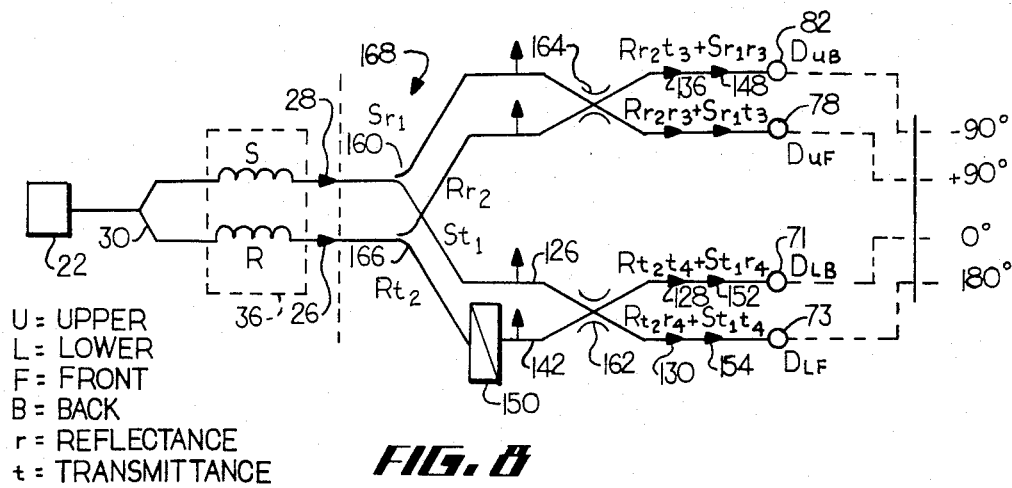
FIG. 8 is a diagram illustrating the amplitudes of the light beams throughout the device of FIG. 6.

And as found above
$$I_2 - I_1 = RS\tau_V\tau_H(r_Vt_H + r_Ht_V)\cos\phi$$
or
if $K_1 = RS(r_Vt_H + r_Ht_V)\rho_V\rho_H$
and $K_2 = RS(r_Vt_H + r_Ht_V)\tau_V\tau_H$
$I_2 - I_1 = \alpha \cos\phi$
$I_3 - I_4 = \beta \sin\phi$ FIG. 5 illustrates an all optical passive homodyne configuration 120. Here the sensor light beam 28 is split by an input beamsplitter 122 into light beams 124 and 126. The light beam 124 strikes a beamsplitter 127 and two light beams 128 and 130 are created which fall on the output detectors 71 and 73 respectively. The light beam 126 is split by a beamsplitter 132 into two beams 134 and 136 which in turn fall on detectors 82 and 78 respectively. The reference light beam 26, having the same polarization as the sensor light beam, is split by an input beamsplitter 140 into two beams 142 and 144, the light beam 144 is split by beamsplitter 132 into beams 146 and 148 which fall respectively on detectors 78 and 82. The light beam 142 enters a 90° phase shifter 150 before being split by the beamsplitter 127 into light beams 152 and 154 which fall on detectors 71 and 73 respectively. The 90° phase shifter 150 can be any device whose optical path length is an integral number of light wavelengths plus ¼ wavelength more, such as a piece of glass of the appropriate length. The end result is that the detectors 71, 73, 78 and 82 produce signals representative of 0° phase shift, 180° phase shift, +90° phase shift, and −90° phase shift respectively as with previously described demodulators 54 and 110. By replacing the beamsplitters 122, 127, 132 and 140 with fiber couplers 160, 162, 164 and 166 respectively, as shown in FIG. 6, a similar demodulator 168 is produced. The 90° phase shifter 150 for the demodulator 168 could be produced by stretching the fiber 169, of the fiber coupler 166 or by carefully setting its length when attaching it to fiber coupler 162. The performance of the demodulator 168 is similar to that of the demodulator 120. The amplitudes of the light beams in modulators 120 and 168 are illustrated in FIGS. 7 and 8 respectively. A detail analysis of these systems which are functionally identical follows:

$$D_{UB} = Rr_2t_3\cos\omega t + Sr_1r_3\cos(\omega t + \phi)$$

$$I_{UB} = \frac{R^2r_2^2t_3^2}{2} + \frac{S^2r_1^2r_3^2}{2} + RSr_1r_2t_3r_3\cos\phi$$

$$D_{UF} = Rr_2r_3\cos\omega t - Sr_1t_3\cos(\omega t + \phi)$$

$$I_{UF} = \frac{R^2r_2^2r_3^2}{2} + \frac{S^2r_1^2t_3^2}{2} - RSr_1r_2t_3r_3\cos\phi$$

$$I_{UB} - I_{UF} = \frac{R^2r_2^2}{2}(t_3^2 - r_3^2) - \frac{S^2r_1^2}{2}(t_3^2 - r_3^2) + 2RSr_1r_2t_3r_3\cos\phi$$

Setting $a_1$, the gain on signal $I_{UF}$, equal to $$a = \frac{S^2r_1^2r_3^2 + R^2r_2^2t_3^2}{S^2r_1^2t_3^2 + R^2r_2^2r_3^2}$$

then $I_{UB} - aI_{UF} = RSr_1r_2t_3r_3(1 + a)\cos\phi$

Similarly, $$D_{LB} = Rt_2t_4\cos(\cos\omega t + \pi/2) + St_1r_4\cos(\omega t + \phi)$$

$$= Rt_2t_4\sin\omega t + St_1r_4\cos(\omega t + \phi)$$

$$I_{LB} = \frac{R^2t_2^2t_4^2}{2} + \frac{S^2t_1^2r_4^2}{2} - RSt_1t_2r_4t_4\sin\phi$$

$$D_{LF} = Rt_2r_4\sin t - St_1t_4\cos(\omega t + \phi)$$

$$I_{LF} = \frac{R^2t_2^2r_4^2}{2} + \frac{S^2t_1^2t_4^2}{2} + RSt_1t_2r_4t_4\sin\phi$$

$$I_{LF} - I_{LB} = \frac{R^2t_2^2}{2}(r_4^2 - t_4^2) - \frac{S^2t_1^2}{2}(r_4^2 - t_4^2) +$$

-continued $$2RSt_1t_2r_4t_4\sin\phi$$

As in the previous case, $b$, the gain on signal $I_{LB}$, is set equal to $$b = \frac{R^2t_2^2r_4^2 + S^2t_1^2t_4^2}{R^2t_2^2t_4^2 + S^2t_1^2r_4^2}$$

then $I_{LF} - bI_{LB} = RSt_1t_2r_4t_4 (1 + b) \sin\phi$

It is useful to note that in the electronic reduction of the $\sin\phi$ and $\cos\phi$ terms, any error in the separation of the cosine and sine terms disappears to first order If $\sin(\phi + \epsilon)$ rather than $\sin\phi$, where $\epsilon << 1$, then if $M = I\mu_B - aI\mu_F = K_1 \cos\phi$ and
$N = I_{LF} - bI_{LB} = K_2 \sin(\phi + \epsilon)$ the expression below can be generated $$M\dot{N} - \dot{M}N = K_1K_2\dot\phi\cos\phi\cos(\phi + \epsilon) + K_1K_2\dot\phi\sin\phi\cos(\phi + \epsilon)$$

$$= K_1K_2\dot\phi\cos[(\phi + \epsilon) - \phi]$$

$$= K_1K_2\dot\phi\cos\epsilon$$

$$= K_1K_2\dot\phi$$

Therefore $\phi = \int (M\dot{N} - \dot{M}N) dt$

Thus the technique is relatively insensitive to inaccuracies in the separation of sines and cosines.

Figure 9:
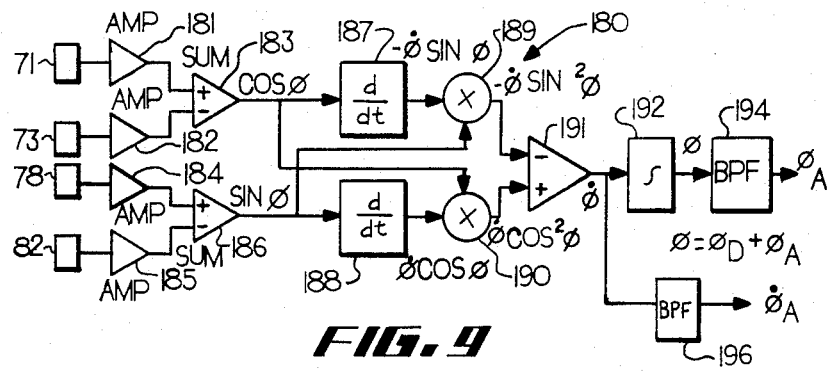
FIGS. 9 and 10 are diagrams of electronic devices to process the optical sine and cosine output signals from an optical demodulator into an electrical signal representative of the phase difference between input signals to the demodulator.
Figure 10:
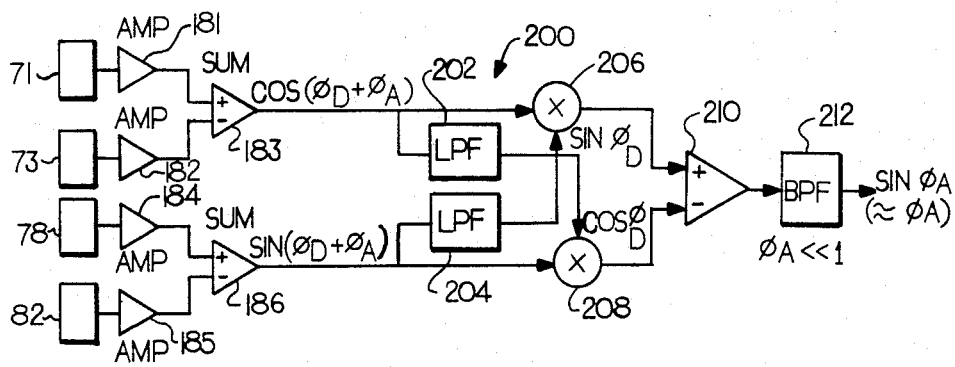
Figure 11:
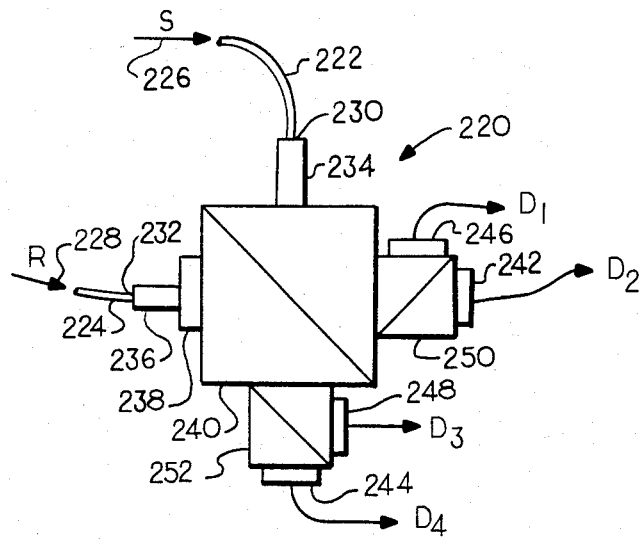
FIG. 11 shows a demodulator where in the optical components are cemented in a block.

Two electronic methods to process the offset sine and cosine output signals from the optical demodulators 54, 110, 120 and 168 are shown in FIGS. 9 and 10. In the electronic circuit 180 shown in FIG. 9 the outputs of the detectors 71 and 73 are amplified in amplifiers 181 and 82 and differenced in summer 183 to produce $\sin\phi$. Detectors 78 and 82 are amplified in amplifiers 184 and 185 and differenced in summer 186 to produce $\cos\phi$. The time derivatives of the cosine and sine signals out of the two summing devices 183 and 186 are produced by differentiators 187 and 188. The time derivative output signal is then multiplied by the alternate, undifferentiated signal in multipliers 189 and 190. The outputs of the multipliers 189 and 190 are differenced in a summing amplifier 191 whose output, $d\phi/dt$ is integrated by an integrator 192 to produce the desired phase shift $\phi$ as a function of time within the pass band, specified by passing the unfiltered signal $\phi$ through a high bandpass filter 194 which removes the low frequency phase shift $\phi_D$ leaving the acoustic phase shift $\phi_A$. Alternately, the output of the summing amplifier 191, $d\phi/dt$, may also be filtered by a bandpass filter 196 to produce $d\phi_A/dt$.

In the circuit 200 of FIG. 10, the outputs from the detectors 71 and 73 and 78 and 82 are filtered by low pass filters 202 and 204 and then multiplied by the unfiltered alternate signal in multipliers 206 and 208. The outputs of the multipliers 206 and 208 are then differenced in a summing amplifier 210 and passed thru a bandpass filter 212 to produce $\sin\phi_A$ which closely approximates the desired phase shift $\phi_A$ when $\phi_A$ is much less than 1.

A modified demodulator 220 is shown in a form particularly useful when the demodulator 220 is to be subjected to high G environments. The sensor and reference fibers 222 and 224 carry the signal and reference beams 226 and 228 whose polarizations are made linear and are set at 45° to the vertical axis. The ends 230 and 232 of the fibers 222 and 224 are attached to quarter pitch graded index rods 234 and 236 which act as lenses to columnate the light beams 226 and 228 respectively. The columnated reference beam 228 next passes through a quarter wave birefringent plate 238 whose last axis is set vertical. Thus when the horizontal components of polarization of the signal and reference beams 226 and 228 are combined and split in the central beamsplitter 240 and sent to detectors 242 and 244, they are 90° out of phase with respect to the vertical components of the signal and reference beams 226 and 228 which are combined and split in the central beamsplitter 240 and sent to detectors 246 and 248. A polarizing beamsplitter 250 is mounted between the central beamsplitter 240 and the detectors 242 and 246 while a second polarizing beamsplitter 252 is mounted between the central beamsplitter 240 and detectors 244 and 248. The polarizing beamsplitters 250 and 252 serve to properly direct the horizontal components of polarization into detectors 242 and 244 and the vertical components into detectors 246 and 248 so that as before, a matched set of quadrature phase shift components $D_1$, $D_2$, $D_3$ and $D_4$ result.

Figure 12:
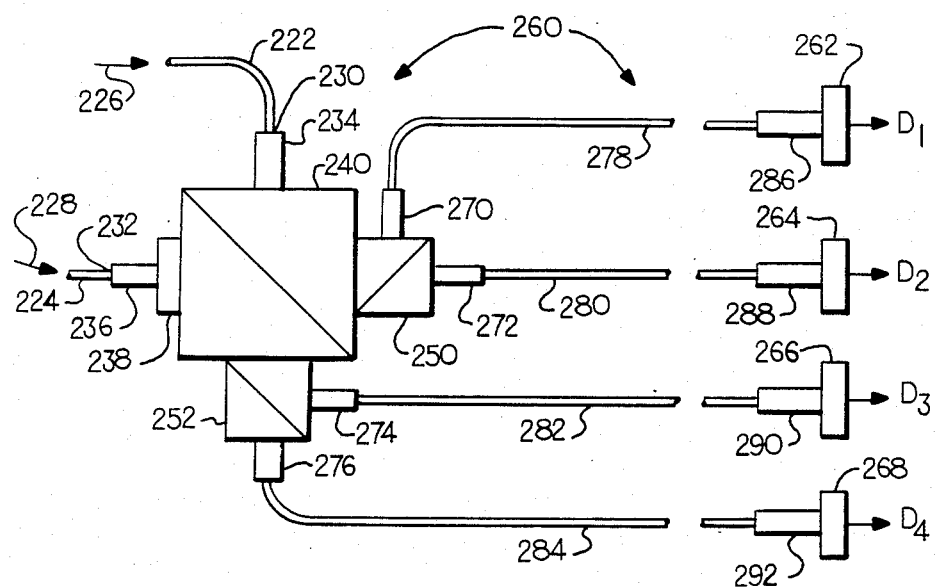
FIG. 12 shows a demodulator which is a modified version of the demodulator of FIG. 11 having remote detectors.
Figure 13:
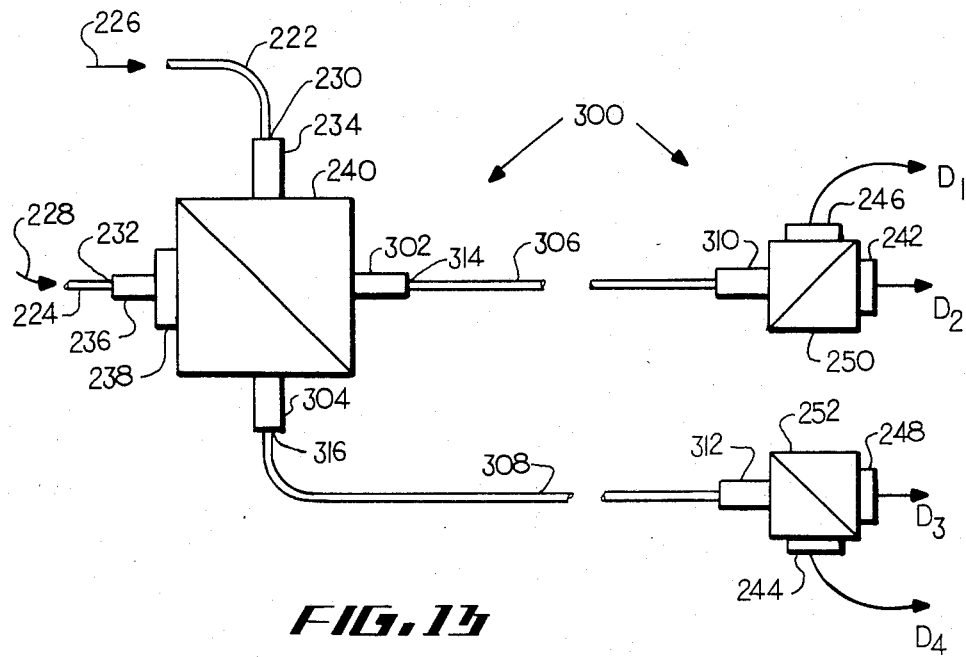
FIG. 13 shows a demodulator modified from that of FIG. 12 having remote polarizing beamsplitters and detectors.

As shown with the demodulator 260 of FIG. 12 it is possible to remotely locate detectors 262, 264, 266 and 268 used to convert the optical outputs of the demodulator 260 into electrical signals $D_1$, $D_2$, $D_3$ and $D_4$. The demodulator 220 is modified into the demodulator 260 by substituting graded index lenses 270, 272, 274 and 276 for detectors 246, 242, 248 and 244 respectively. The graded index lenses 270, 272, 274 and 276 focus the combined demodulator output signals of the polarizing beamsplitters 250 and 252 into optical fibers 278, 280, 282 and 284 which can be single mode or multimode fibers. These fibers 278, 280, 282 and 284 are then coupled to the detectors 262, 264, 266 and 268 by graded index lenses 286, 288, 290 and 292 for conversion into the signals, $D_1$, $D_2$, $D_3$ and $D_4$. This remote location of the detectors 262, 264, 266 and 268 is advantageous when operating in areas where electric fields are of such a magnitude as to cause interference in electrical signal line. The optical fibers 278, 280, 282 and 284 are insensitive to electric fields in such application.

Figure 14:
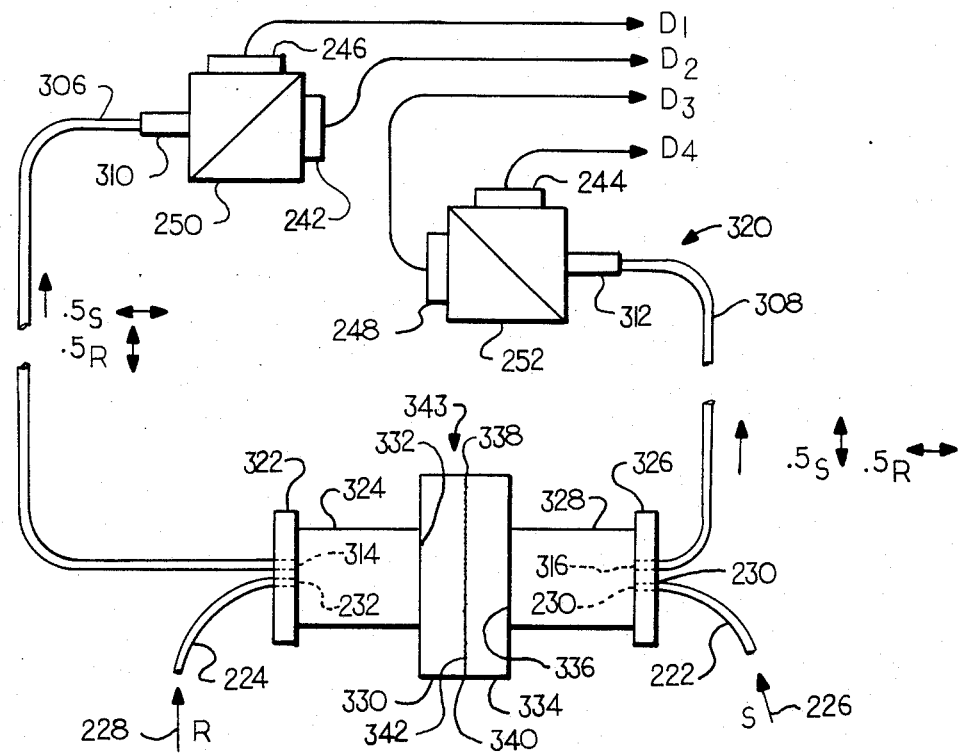
FIG. 14 shows a modified version of the demodulator of FIG. 13 designed to reduce component count.

It is also possible to locate the beamsplitting polarizers 250 and 252 remotely from the central beamsplitter 240 such as shown in FIG. 12. In this demodulator 300, the outputs from the central beamsplitter 240 are coupled to the polarizing beamsplitters 250 and 252 by means of graded index lenses 302 and 304, polarization preserving single mode optical fibers 306 and 308 and graded index lenses 310 and 312. Light from the central beamsplitter 240 of the demodulator 300 that carries the appropriately mixed light beams in the correct polarization states is focused into the ends 314 and 316 of the polarization preserving fibers 306 and 308 by the lenses 302 and 304 respectively. The light beams are transported and maintained in the correct state of polarization and exit the fibers 306 and 308 to be recolumnated by the graded index lenses 310 and 312 for application to the polarizing beamsplitters 250 and 252. The columnated light beams are then split by the polarizing beamsplitters 250 and 252 into the micro-optic demodulator outputs which fall onto the detectors 246, 242, 248 and 244 to produce the electrical signals $D_1$, $D_2$, $D_3$ and $D_4$ respectively.

it is also possible to replace the central beamsplitter 240 as shown with demodulator 320 shown in FIG. 14. The ends 232 and 314 of the reference fiber 224 and the transmitting fiber 306 are mounted side-by-side in a ferrule 322 which attaches them to a quarter pitch graded index rod 324 to provide columnated beam matching for the fibers 224 and 306. Signal fiber 222 and transmitting fiber 308 are likewise attached at their ends 230 and 316 side-by-side in a ferrule 326 which holds them in proper position with respect to a second quarter pitch graded index rod 328 to provide columnated beam matching for the fibers 222 and 308. A quarter wave plate 330 is connected to the opposite end 332 of the rod 324 from the ferrule 322 while a glass plate 334 is connected to the opposite end 336 of the rod 328. The quarter wave plate 330 and the glass plate 334 are connected at an interface 338 with the joined surface 340 of the glass plate 332 having a 50%—50% partially reflective coating 342 on its surface 340. Once the assembly of the ferrules 322 and 326, the rods 324 and 328, and the plates 330 and 344 are aligned, they are glued together with optical cement to form a solid block 343. The input polarizations on the signal and reference fibers 222 and 224 are both made linear and set vertical. The quarter wave plate 330 has its axis set at 45° to the vertical. This causes light beams passing therethrough to be shifted in olarization 90°. Therefore, the reference beam 28 passes through the quarter wave plate 330 and is shifted from vertical to horizontal polarization. Half of the reference beam 228 reflects off of the coating 340 and passes back through the plate 330 which restores the vertical polarization thereto while the other half is coupled into the end 316 with horizontal polarization. Half of the sensor beam 226 reflects off of the coating 340 and is transmitted through fiber 308 with its original vertical polarization whereas the other half passes through the coating 340 and is converted to horizontal polarization by the plate 330 for mixing with the vertically polarized half of the reference beam 228 and transmitted through the polarization preserving fiber 306. The fibers 306 and 308 have their axes aligned with vertical and horizontal respectively. Therefore, the polarizing beamsplitters 250 and 252 are fed the same beam components as they are when used in demodulators 220, 260 and 300.

The embodiments described can be used as demodulators for homodyne systems. In particular they are suitable for usage in underwater towed arrays such as those of oil companies during underwater seismic exploration. Other applications include land-based oil exploration and use with magnetic, magneto-optic, electric field, temperature, pressure, and vibration sensors.

Since the signals can remain in the optical domain for transmission, the present invention allows the deployment of highly sensitive sensors in an array without electrical leads. This has a number of advantages, including reducing electromagnetic interference, elimination electrical power requirements in the array itself, and expandability into larger arrays.

Therefore there has been shown and described novel passive homodyne demodulators which fulfill all the objects and advantages sought therefore. Many changes, alterations, modifications and other uses and applications of the subject invention will become apparent to those skilled in the art after considering this specification together with the accompanying drawings. All such changes, alterations and modifications which do not depart from the spirit and scope of the invention are deemed to be covered by the invention which is limited only by the claims which follows.

What is claimed is:

1. A sensor system using light as the sensing medium including:
   a light source which produces a light beam of predetermined coherence;
   first beamsplitter means which split said light beam of predetermined coherence into a reference light beam and a sensor input light beam;
   means to impress the effect to be sensed on said sensor input light beam in the form of relative phase changes, $\phi$, thereof with respect to said reference light beam to generate a sensor output light beam;
   means to produce a relative linear polarization difference of 90° between said reference light beam and said sensor input light beam;
   means to mix said reference light beam and said sensor output light beam; and
   means to demodulate said mix of said reference light beam and said sensor output light beam into at least a first demodulated light beam having an amplitude which is a function of sin $\phi$, said means to produce a relative linear polarization difference of 90° between said reference light beam and said sensor input light beam including:
   means to produce said reference light beam with a polarization defined as vertical and said sensor input light beam with a polarization defined as horizontal, said means to mix said reference light beam and said sensor output light beam including:
   optical coupler means having:
     a reference input connected to receive said reference light beam;
     a sensor input connected to receive said sensor output light beam;
     a first output out through which passes a first mixed beam having a vertical reference light beam component and a horizontal sensor output light beam component; and
     a second output out through which passes a second mixed beam having a vertical reference light beam component and a horizontal sensor output light beam component, and wherein said means to demodulate said mix of said reference light beam and said sensor output light beam into at least a first demodulated light beam having an amplitude which is a function of sin $\phi$ also include:
   means to demodulate said mix of reference light beam and said sensor output light beam into second, third, and fourth demodulated light beams, said first, second, third, and fourth demodulated light beams, having amplitudes of K+sin $\phi$, K−sin $\phi$, K+cos $\phi$, and K−cos $\phi$ respectively where K is a constant having a magnitude of at least 1;
   first polarized beamsplitter means which separate said mix of said reference light beam and said sensor output light beam into first and second predetermined component beams thereof;
   second polarized beamsplitter means which separate said first predetermined component beams into third and fourth predetermined component beams;
   means to optically orient said second polarized beamsplitter means at 45° with respect to said first polarized beamsplitter means;
   third polarized beamsplitter means which separate said second predetermined component beams into fifth and sixth predetermined component beams, said third predetermined component beams;
   means to optically orient said third polarized beamsplitter means at 45° with respect to said first polarized beamsplitter means;
   means to combine said third predetermined component beams into said first demodulated light beam;

means to combine said fourth predetermined component beams into said second demodulated light beam;

means to combine said fifth predetermined component beams into said third demodulated light beam; and means to combine said sixth predetermined component beams into said fourth demodulated light beam.

2. The sensor system as defined in claim 1 wherein said means to mix said reference light beam and said sensor output light beam include:

an optical coupler having:
a reference input connected to receive said reference light beam;
a sensor input connected to receive said sensor output light beam;
a first output out through which passes a first mixed reference and sensor output light beam; and
a second output out through which passes a second mixed reference and sensor output light beam, said first and second mixed reference and sensor output light beams being optically coupled to said means to demodulate said mix of said reference light beam and said sensor output light beam into at least a first demodulated light beam having an amplitude which is a function of sin $\phi$.

3. A sensor system using light as the sensing medium including:

a light source which produces a light beam of predetermined coherence;
first beamsplitter means which split said light beam of predetermined coherence into a reference light beam and a sensor input light beam;
means to impress the effect to be sensed on said sensor input light beam in the form of relative phase changes, $\phi$, thereof with respect to said reference light beam to generate a sensor output light beam;
means to produce a relative linear polarization difference of 90° between said reference light beam and said sensor input light beam;
means to mix said reference light beam and said sensor output light beam; and
means to demodulate said mix of said reference light beam and said sensor output light beam into at least a first demodulated light beam having an amplitude which is a function of sin $\phi$, wherein said means to demodulate said mix of said reference light beam and said sensor output light beam into at least a first demodulated light beam having an amplitude which is a function of sin $\phi$ also include:
means to demodulate said mix of reference light beam and said sensor output light beam into at least a second demodulated light beam having an amplitude which is a function of cos $\phi$;
first polarized beamsplitter means which separate said mix of said reference light beam and said sensor output light beam into first and second predetermined component beams thereof;
second polarized beamsplitter means which separate said first predetermined component beams into third and fourth predetermined component beams;
third polarized beamsplitter means which separate said second predetermined component beams into fifth and sixth predetermined component beams;

means to combine said third predetermined component beams into said first demodulated light beam; and
means to combine said fifth predetermined component beams into said second demodulated light beam.

4. The sensor system as defined in claim 3 wherein said second polarized beamsplitter means are optically oriented at 45° with respect to said first polarized beamsplitter means and said third polarized beamsplitter means are optically orientated at 45° with respect to said first polarized beamsplitter means.

5. A sensor system using light as the sensing medium including:

a light source which produces a light beam of predetermined coherence;
first beamsplitter means which split said light beam of predetermined coherence into a reference light beam and a sensor input light beam;
means to impress the effect to be sensed on said sensor input light beam in the form of relative phase changes, $\phi$, thereof with respect to said reference light beam to generate a sensor output light beam;
means to produce a relative linear polarization difference of 90° between said reference light beam and said sensor input light beam;
means to mix said reference light beam and said sensor output light beam; and
means to demodulate said mix of said reference light beam and said sensor output light beam into at least a first demodulated light beam having an amplitude which is a function of sin $\phi$, said means to demodulate said mix of said reference light beam and said sensor output light beam into at least a first demodulated light beam having an amplitude which is a function of sin $\phi$ also including:
means to demodulate said mix of reference light beam and said sensor output light beam into second, third, and fourth demodulated light beams, said first, second, third, and fourth demodulated light beams, having amplitudes of K+sin $\phi$, K−sin $\phi$, K+cos $\phi$, and K−cos $\phi$ respectively where K is a constant having a magnitude of at least 1 including:
first polarized beamsplitter means which separate said mix of said reference light beam and said sensor output light beam into first and second predetermined component beams thereof;
second polarized beamsplitter means which separate said first predetermined component beams into third and fourth predetermined component beams, said second polarized beamsplitter means being optically oriented at 45° with respect to said first polarized beamsplitter means;
third polarized beamsplitter means which separate said second predetermined component beams into fifth and sixth predetermined component beams, said third polarized beamsplitter means being optically oriented at 45° with respect to said first polarized beamsplitter means;
means to combine said third predetermined component beams into said first demodulated light beam;
means to combine said fourth predetermined component beams into said second demodulated light beam;
means to combine said fifth predetermined component beams into said third demodulated light beam; and means to combine said sixth predetermined component beams into said fourth demodulated light beam.

6. A sensor system using light as the sensing medium including:
   a light source which produces a light beam of predetermined coherence;
   first beamsplitter means which split said light beam of predetermined coherence into a reference light beam and a sensor input light beam;
   means to impress the effect to be sensed on said sensor input light beam in the form of relative phase changes, $\phi$, thereof with respect to said reference light beam to generate a sensor output light beam;
   means to produce a relative linear polarization difference of 90° between said reference light beam and said sensor input light beam;
   means to mix said reference light beam and said sensor output light beam; and
   means to demodulate said mix of said reference light beam and said sensor output light beam into at least a first demodulated light beam having an amplitude which is a function of sin $\phi$ including:
      first, second, third, and fourth detectors for converting light signals into electrical signals;
      a second beamsplitter positioned to split said reference light beam into first and second reference light beams;
      a third beamsplitter positioned to split said sensor output light beam into first and second sensor output light beams;
      a fourth beamsplitter positioned to split said first reference light beam and said first sensor output light beam into third and fourth reference light beam and third and fourth sensor output light beams, directing said third reference light beam and said third sensor output light beam onto said first detector and said fourth reference light beam and said fourth sensor output light beam onto said second detector;
      a phase shifter positioned to shift the phase of said second reference light beam 90°;
      a fifth beamsplitter positioned to split said phase shifted second reference light beam and said second sensor output light beam into fifth and sixth reference light beam and fifth and sixth sensor output light beams, directing said fifth reference light beam and said fifth sensor output light beam onto said third detector and said sixth reference light beam and said sixth sensor output light beam onto said fourth detector.

7. The sensor system as defined in claim 6 wherein said second, third, fourth, and fifth beamsplitters are fiber optic couplers.

8. A sensor system using light as the sensing medium including:
   a light source which produces a light beam of predetermined coherence;
   first beamsplitter means which split said light beam of predetermined coherence into a reference light beam and a sensor input light beam;
   means to impress the effect to be sensed on said sensor input light beam in the form of relative phase changes, $\phi$, thereof with respect to said reference light beam to generate a sensor output light beam;
   means to produce a relative linear polarization difference of 90° between said reference light beam and said sensor input light beam;
   means to mix said reference light beam and said sensor output light beam; and
   means to demodulate said mix of said reference light beam and said sensor output light beam into at least a first demodulated light beam having an amplitude which is a function of sin $\phi$, wherein said means to mix said reference light beam and said sensor output light beam include:
      means to linearize the polarizations of said sensor output light beam and said reference light beam;
      a second beamsplitter block having first, second, third, and fourth sides, and a vertical axis, said vertical axis being parallel to said second and fourth sides;
      means to couple said sensor output light beam into said second beamsplitter block first side at 45° to said vertical axis thereof; and
      means to couple said reference light beam into said second beamsplitter block second side at 45° to said vertical axis thereof and an average 90° out of phase from said sensor output light beam, said second beamsplitter producing a first mixed beam at said third side and a second mixed beam at said fourth side, and wherein said means to demodulate said mix of said reference light beam and said sensor output light beam include:
      a third beamsplitter positioned receive said first mixed beam from said second beamsplitter and to split said first mixed beam into said first demodulated light beam and a second demodulated light beam having an amplitude of $K - \sin \phi$ where K is a constant having a magnitude of at least 1; and
      a fourth beamsplitter positioned receive said second mixed beam from said second beamsplitter and to split said second mixed beam into a third demodulated light beam having an amplitude of $K + \cos \phi$ and a fourth demodulated light beam having an amplitude of $K = \cos \phi$.

9. The sensor system as defined in claim 8 wherein said means to demodulate said mix of said reference light beam and said sensor output light beam include:
   first, second, third, and fourth detectors for converting light signals into electrical signals, said third and fourth beamsplitters being block beamsplitters having:
   first, second, and third sides, said first side of said third and fourth beamsplitters being mounted to said third and fourth sides of said second beamsplitter respectively, said first detector being mounted to said second side of said third beamsplitter, said second detector being mounted to said third side of said third beamsplitter, said third detector being mounted to said second side of said fourth beamsplitter, said fourth detector being mounted to said third side of said fourth beamsplitter.

10. The sensor system as defined in claim 8 wherein said means to demodulate said mix of said reference light beam and said sensor output light beam include:
    first, second, third, and fourth detectors for converting light signals into electrical signals, said third and fourth beamsplitters being block beamsplitters having:
    first, second, and third sides, said first side of said third and fourth beamsplitters being mounted to said third and fourth sides of said second beamsplitter respectively;
    first optical fiber means to couple said first detector to said second side of said third beamsplitter;

second optical fiber means to couple said second detector to said third side of said third beamsplitter;

third optical fiber means to couple said third detector to said second side of said fourth beamsplitter; and fourth optical fiber means to couple said fourth detector to said third side of said fourth beamsplitter.

11. The sensor system as defined in claim 8 wherein said third and fourth beamsplitters are block beamsplitters having first, second, and third sides, said means to demodulate said mix of said reference light beam and said sensor output light beam include:

first optical fiber means to couple said second beamsplitter to said first side of said third beamsplitter;

second optical fiber means to couple said second beamsplitter to said first side of said fourth beamsplitter;

first, second, third, and fourth detectors for converting light signals into electrical signals, said first detector being mounted to said second side of said third beamsplitter, said second detector being mounted to said third side of said third beamsplitter, said third detector being mounted to said second side of said fourth beamsplitter, said fourth detector being mounted to said third side of said fourth beamsplitter.

12. A sensor system using light as the sensing medium including:

a light source which produces a light beam of predetermined coherence;

first beamsplitter means which split said light beam of predetermined coherence into a reference light beam and a sensor input light beam;

means to impress the effect to be sensed on said sensor input light beam in the form of relative phase changes, $\phi$, thereof with respect to said reference light beam to generate a sensor output light beam;

means to produce a relative linear polarization difference of 90° between said reference light beam and said sensor input light beam;

means to mix said reference light beam and said sensor output light beam; and means to demodulate said mix of said reference light beam and said sensor output light beam into at least a first demodulated light beam having an amplitude which is a function of $\sin \phi$, wherein said means to mix said reference light beam and said sensor output light beam include:

means to linearize the polarizations of said sensor output light beam and said reference light beam;

a quarter wave plate having a first and an opposite second side;

means to couple said reference light beam to said quarter wave plate first side; and a transparent plate having a first side and an opposite second side, said opposite second side of said transparent plate having a partially reflective coating thereon, said opposite second sides of said quarter wave plate and said transparent plate being positioned together whereby said quarter wave plate and said transparent plate produce a first mixed beam out of said first side of said quarterwave plate and a second mixed beam out of said first side of said transparent plate, and wherein said means to demodulate said mix of said reference light beam and said sensor output light beam include:

a second beamsplitter positioned receive said first mixed beam from said quarter wave plate and to split said first mixed beam into said first demodulated light beam and a second demodulated light beam having an amplitude of $K - \sin \phi$ where K is a constant having a magnitude of at least 1; and a third beamsplitter positioned receive said second mixed beam from said transparent plate and to split said second mixed beam into a third demodulated light beam having an amplitude of $K + \cos \phi$ and a fourth demodulated light beam having an amplitude of $K - \cos \phi$.

13. The sensor system as defined in claim 12 wherein said second and third beamsplitters are block beamsplitters having first, second, and third sides, said means to demodulate said mix of said reference light beam and said sensor output light beam further include:

first optical fiber means to couple said first side of said quarter wave plate to said first side of said second beamsplitter;

second optical fiber means to couple said first side of said transparent plate to said first side of said third beamsplitter;

first, second, third, and fourth detectors for converting light signals into electrical signals, said first detector being mounted to said second side of said second beamsplitter, said second detector being mounted to said third side of said second beamsplitter, said third detector being mounted to said second side of said third beamsplitter, said fourth detector being mounted to said third side of said third beamsplitter.

14. A sensor system using light as the sensing medium including:

a light source which produces a light beam of predetermined coherence;

first beamsplitter means which split said light beam of predetermined coherence into a reference light beam and a sensor input light beam;

means to impress the effect to be sensed on said sensor input light beam in the form of relative phase changes, $\phi$, thereof with respect to said reference light beam to generate a sensor output light beam;

means to produce a relative linear polarization difference of 90° between said reference light beam and said sensor input light beam;

means to mix said reference light beam and said sensor output light beam;

means to demodulate said mix of said reference light beam and said sensor output light beam into at least a first demodulated light beam having an amplitude which is a function of $\sin \phi$ including:

means to demodulate said mix of reference light beam and said sensor output light beam into second, third, and fourth demodulated light beams, said first, second, third, and fourth demodulated light beams, having amplitudes of $K + \sin \phi$, $K - \sin \phi$, $K + \cos \phi$, and $K - \cos \phi$ respectively where K is a constant having a magnitude of at least 1; and a first detector positioned to receive said at least first demodulated light beam to convert said amplitude into a first electrical signal which is $K - \sin \phi$, and said means to demodulate said mix of reference light beam and said sensor output light beam into second, third, and fourth demodulated light beams including:

a second detector positioned to receive said second demodulated light beam to convert said amplitude into a second electrical signal which is $K-\sin\phi$;

a third detector positioned to receive said third demodulated light beam to convert said amplitude into a third electrical signal which is $K+\cos\phi$; and a fourth detector positioned to receive said fourth demodulated light beam to convert said amplitude into a fourth electrical signal which is $K-\cos\phi$; and processing means to transform said first, second, third, and fourth electrical signals into a fifth electrical signal representative of $\phi$, said processing means including:

first means to combine said first and second electrical signals into an output electrical signal representative of $\sin\phi$;

second means to combine said third and fourth electrical signals into an output electrical signal representative of $\cos\phi$;

first differentiator means connected to differentiate said electrical signal representative of $\sin\phi$ to produce an electrical signal, $\dot\phi\cos\phi$;

second differentiator means connected to differentiate said electrical signal representative of $\cos\phi$ to produce an electrical signal, $-\dot\phi\sin\phi$;

first multiplier means to multiply said output signals of said first means to combine and said second differentiator means together into an output electrical signal representative of $-\dot\phi\sin^2\phi$;

second multiplier means to multiply said output signals of said second means to combine and said first differentiator means together into an output electrical signal representative of $-\dot\phi\cos^2\phi$;

third combiner means connected to said output electrical signals representative of $-\dot\phi\sin^2\phi$ and $\dot\phi\cos^2\phi$ to produce therefrom an output electrical signal, $\dot\phi$; and integrator means connected to said output electrical signal, $\dot\phi$, to produce therefrom $\phi$.

15. A sensor system using light as the sensing medium including:

a light source which produces a light beam of predetermined coherence;

first beamsplitter means which split said light beam of predetermined coherence into a reference light beam and a sensor input light beam;

means to impress the effect to be sensed on said sensor input light beam in the form of relative phase changes, $\phi$, thereof with respect to said reference light beam to generate a sensor output light beam;

means to produce a relative linear polarization difference of 90° between said reference light beam and said sensor input light beam;

means to mix said reference light beam and said sensor output light beam;

means to demodulate said mix of said reference light beam and said sensor output light beam into at least a first demodulated light beam having an amplitude which is a function of $\sin\phi$ including:

means to demodulate said mix of reference light beam and said sensor output light beam into second, third, and fourth demodulated light beams, said first, second, third, and fourth demodulated light beams, having amplitudes of $K+\sin\phi$, $K-\sin\phi$, $K+\cos\phi$, and $K-\cos\phi$ respectively where K is a constant having a magnitude of at least 1; and a first detector positioned to receive said at least first demodulated light beam to convert said amplitude into a first electrical signal which is $K-\sin\phi$, and said means to demodulate said mix of reference light beam and said sensor output light beam into second, third, and fourth demodulated light beams including:

a second detector positioned to receive said second demodulated light beam to convert said amplitude into a second electrical signal which is $K-\sin\phi$;

a third detector positioned to receive said third demodulated light beam to convert said amplitude into a third electrical signal which is $K+\cos\phi$; and a fourth detector positioned to receive said fourth demodulated light beam to convert said amplitude into a fourth electrical signal which is $K-\cos\phi$; and processing means to transform said first, second, third, and fourth electrical signals into a fifth electrical signal representative of $\phi$, said processing means including:

first means to combine said first and second electrical signals into an output electrical signal representative of $\sin\phi$;

second means to combine said third and fourth electrical signals into an output electrical signal representative of $\cos\phi$;

first low pass filter means connected to said electrical signal representative of $\sin\phi$ to produce a first low pass filter electrical signal output;

second low pass filter means connected to said electrical signal representative of $\cos\phi$ to produce a second low pass filter electrical signal output;

first multiplier means to multiply said output signals of said first means to combine and said second low pass filter means together into a first multiplier means output electrical signal;

second multiplier means to multiply said output signals of said second means to combine and said first low pass filter means together into a second multiplier means output electrical signal;

third combiner means connected to said output electrical signals of said first and second multipliers to produce therefrom a third combiner means output electrical signal; and first band pass filter means connected to said third combiner means output electrical signal to produce therefrom $\phi$ when $\phi$ is much less than 1.

16. A sensor system using light as the sensing medium including:

a light source which produces a light beam of predetermined coherence;

first beamsplitter means which split said light beam of predetermined coherence into a reference light beam and a sensor input light beam;

means to impress the effect to be sensed on said sensor input light beam in the form of relative phase changes, $\phi$, thereof with respect to said reference light beam to generate a sensor output light beam;

means to produce a relative linear polarization difference of 90° between said reference light beam and said sensor input light beam;

means to mix said reference light beam and said sensor output light beam; and means to demodulate said mix of said reference light beam and said sensor output light beam into at least a first demodulated light beam having an amplitude which is a function of sin $\phi$, said means to produce a relative linear polarization difference of 90° between said reference light beam and said sensor input light beam including:

means to produce said reference light beam with a polarization defined as vertical and said sensor input light beam with a polarization defined as horizontal, said means to mix said reference light beam and said sensor output light beam including:

optical coupler means having:
- a reference input connected to receive said reference light beam;
- a sensor input connected to receive said sensor output light beam;
- a first output through which passes a first mixed beam having a vertical reference light beam component and a horizontal sensor output light beam component; and
- a second output out through which passes a second mixed beam having a vertical reference light beam component and a horizontal sensor output light beam component, and wherein said means to demodulate said mix of said reference light beam and said sensor output light beam into at least a first demodulated light beam having an amplitude which is a function of sin $\phi$ also include:

means to demodulate said mix of reference light beam and said sensor output light beam into second, third, and fourth demodulated light beams, said first, second, third, and fourth demodulated light beams, having amplitudes of K+sin $\phi$, K−sin $\phi$, K+cos $\phi$, and K−cos $\phi$ respectively where K is a constant having a magnitude of at least 1;

first polarized beamsplitter means which separate said said mix of said reference light beam and said sensor output light beam into first and second predetermined component beams traveling in different directions;

reflecting means positioned to intercept said second predetermined component beams and to direct them parallel to said first predetermined component beams;

second polarized beamsplitter means which separate said first and second predetermined component beams into third, fourth, fifth, and sixth predetermined component beams;

means to optically orientate said second polarized beamsplitter means at 45° with respect to said first polarized beamsplitter means;

means to combine said third predetermined component beams into said first demodulated light beam;

means to combine said fourth predetermined component beams into said second demodulated light beam;

means to combine said fifth predetermined component beams into said third demodulated light beam; and means to combine said sixth predetermined component beams into said fourth demodulated light beam.

* * * * *

UNITED STATES PATENT AND TRADEMARK OFFICE
CERTIFICATE OF CORRECTION

PATENT NO. : 4,609,290
DATED : 2 September 1986
INVENTOR(S) : Richard F. Cahill

It is certified that error appears in the above—identified patent and that said Letters Patent is hereby corrected as shown below:

Column 4, line 66, "$Rt_V \tau_V$" should be --$Rt_V \rho_V$--.

Column 5, line 11, the word "rotors" should be --rotators--.

Column 7, line 2, the formula "$\dfrac{RSr_H t_V \tau_H \tau_V \cos\emptyset}{2}$"

should be --$\dfrac{RSr_H t_V \tau_V \tau_H \cos\emptyset}{2}$--.

Column 7, line 25, the minus sign "-" should be a plus sign --+--.

Column 9, line 31, the numeral "82" should be --182--.

Column 10, line 61, the word "it" should be --It--.

Column 11, line 19, the word "olarization" should be --polarization--.

Column 11, line 63, the word "follows" should be --follow--.

Column 16, line 38, (Claim 8) the equal sign "=" should be a minus sign -- - --.

Column 19, line 23, (Claim 14) "$\emptyset$" (first occurrence) should be --$\dot{\emptyset}$--.

UNITED STATES PATENT AND TRADEMARK OFFICE
CERTIFICATE OF CORRECTION

PATENT NO. : 4,609,290

DATED : 2 September 1986

INVENTOR(S) : Richard F. Cahill

It is certified that error appears in the above—identified patent and that said Letters Patent is hereby corrected as shown below:

line 26, "$\emptyset$" (first occurrence) should be --$\dot{\emptyset}$--.

line 30, "$\emptyset$" (first occurrence) should be --$\dot{\emptyset}$--.

line 34, "$\emptyset$" (first occurrence) should be --$\dot{\emptyset}$--.

line 36, "$\emptyset$" (first occurrence) should be --$\dot{\emptyset}$--.

line 37, "$\emptyset$" (first occurrence) should be --$\dot{\emptyset}$--.

line 38, "$\emptyset$" should be --$\dot{\emptyset}$--.

line 40, "$\emptyset$" (first occurrence) should be --$\dot{\emptyset}$--.

UNITED STATES PATENT AND TRADEMARK OFFICE
CERTIFICATE OF CORRECTION

PATENT NO. : 4,609,290

DATED : 2 September 1986

INVENTOR(S) : Richard F. Cahill

It is certified that error appears in the above—identified patent and that said Letters Patent is hereby corrected as shown below:

Column 21, line 19, (Claim 16) the word --out-- should be inserted after the word "output".

Signed and Sealed this

Ninth Day of February, 1988

Attest:

DONALD J. QUIGG

Attesting Officer

Commissioner of Patents and Trademarks